March 23, 1954     R. C. BEITZ     2,673,318

ELECTRIC MOTOR

Original Filed Sept. 16, 1947

INVENTOR
RICHARD C. BEITZ
BY Louis L. Gagnon
Noble S. Williams
ATTORNEYS

Patented Mar. 23, 1954

2,673,318

UNITED STATES PATENT OFFICE 2,673,318

ELECTRIC MOTOR

Richard C. Beitz, Amherst, N. Y., assignor to American Optical Company, Southbridge, Mass., a voluntary association of Massachusetts Original application September 16, 1947, Serial No. 774,393. Divided and this application June 10, 1952, Serial No. 292,694

6 Claims. (Cl. 318—125)

The invention described in copending application, Serial Number 774,393 filed September 16, 1947, now Patent No. 2,630,736, of which this application is a division, relates to color analyzing apparatus and more particularly to spectrophotometric apparatus for providing substantially instantaneously and simultaneously visual indications of the several wave lengths and respective intensities of light either transmitted by or reflected from various materials while under examination. The apparatus disclosed in the earlier filed application is so constructed and arranged that even though the material being examined may be of fixed or of changing color characteristics, immediate analyzation of the material may be obtained, thus allowing, for example, its use in many commercial processes and the like for indicating needed adjustments or corrections of the process without delay. Accordingly, more uniform maintenance of required standards, high qualities and other desired properties in the goods or materials being produced may be had by use of the apparatus or device of said earlier application.

Said earlier application, accordingly, comprises apparatus for illuminating and analyzing the color characteristics of either transparent or opaque materials in such a way that the component colors of the material and their respective intensities may be individually and simultaneously graphically presented upon a calibrated screen or the like, so that same may be visually inspected, compared, traced, photographed or the like. The analyzing apparatus thereof comprises simple and inexpensive means for so modifying the combined normal performance characteristics of parts of the apparatus that for transmitted or reflected light there is produced upon the screen a luminous substantially straight line indicating substantially 100% transmission (or reflectance, as the case may be) for each of the several color components thereof. Thus, when material is inserted for analysis, the intensities of the several color components thereof may be individually and simultaneously indicated by per cent transmission or some other well understood evaluating units.

Furthermore, the apparatus of said earlier application is arranged so that the several wave lengths received from the material may be indicated in a horizontal direction upon the screen and the intensities or percentages of transmission (or reflectance) indicated in the vertical direction and in such proportions to calibrations on the screen as to accurately present thereon a well-known form of percentage transmission curve (or percentage reflectance curve). Said apparatus further comprises simple, lightweight, compact and inexpensive means which is operable upon a conventional source of alternating current and arranged to cause said light analyzing means to produce a wave motion in a definite phase relation to and of like frequency with the current supply. Adjustable means is provided to cause this wave motion to have a definite wave form of such shape as to accurately produce upon a rectilinearly calibrated screen or upon a progressively increasing calibrated screen (corresponding to the natural spacing of the spectrum colors) said percentage transmission and percentage reflectance curves. This adjustable means also allowing compensating for slight variations in functioning of the apparatus. Said apparatus additionally includes means for removing or "blanking out" portions of the "curve" which normally would appear upon the screen, portions which would not be truly representative of the color characteristics of the material under consideration. And, furthermore, readily operable means is provided for allowing adjustment of the apparatus so as to modify its white light performance for slightly modifying end portions of the "curve" upon the screen to allow for an accurate adjustment thereof into a straight line condition for 100% transmission or reflectance at all spectrum wave lengths.

The present divisional application is directed to novelty in the details of the means for causing the light analyzing means to produce a wave motion in definite phase relation to and of like frequency with the current supply therefor and with the wave form thereof of such shape as to accurately produce upon a rectilinearly calibrated scale a percentage transmission or a percentage reflectance curve. Said means is in the form of a rapidly vibrating electric motor and electrical and mechanical components associated therewith which are of simple, light weight, compact and inexpensive construction and certain components of which are readily adjustable for enabling said wave motion to accurately match the size and shape of said rectilinearly calibrated scale.

The invention will be better understood from the detailed description which follows when taken in conjunction with the accompanying drawings in which.

Figure 1:
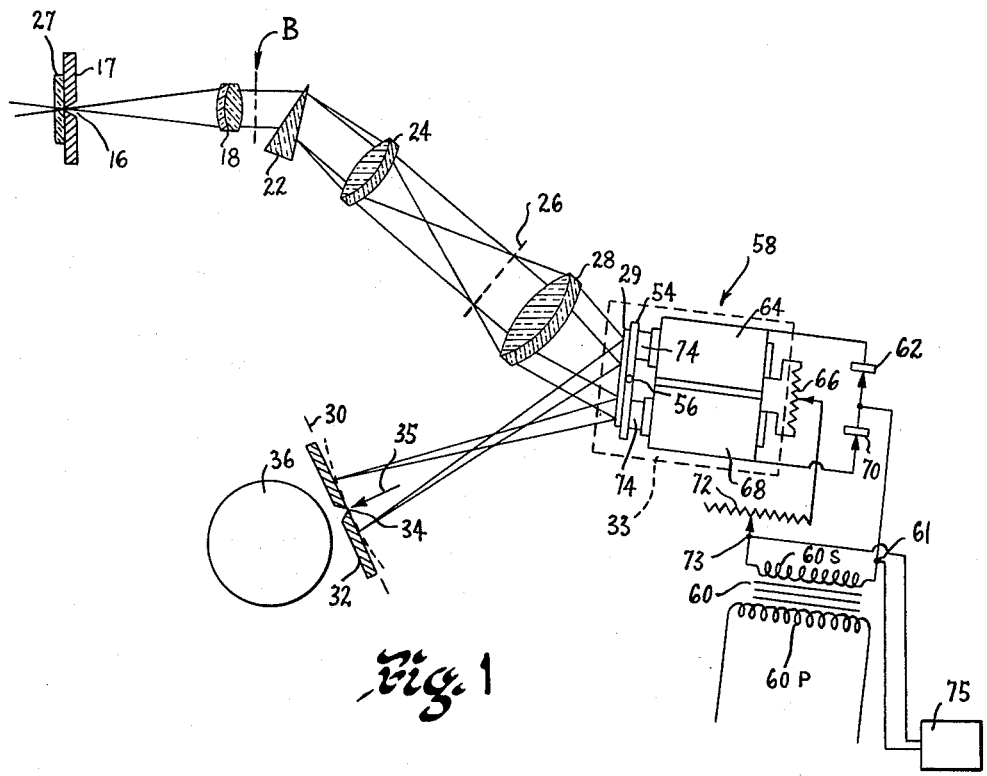
Fig. 1 shows a diagrammatic representation of a preferred form of the apparatus of the present invention.

Referring to the drawings in detail and particularly Fig. 1, the numeral 16 indicates an entrant slit formed in a wall 17. The slit 16 may be brightly lighted by a concentrated beam of substantially "white" light and thus serves as a source of illumination. A collimating lens system 18 is positioned to focus on this slit and produce a beam of parallel light 20 which impinges upon a prism 22. The prism 22 serves to refract and disperse this beam 20 and a lens system 24 is so positioned relative thereto that it serves to focus the light as a spectrum at a predetermined plane 26. In this way the more or less white light emitted at the entrant slit 16 is broken up into its component colors. The parts of the apparatus just described diagrammatically represent a well-known form of monochromator. A filter 27 or combination of filters to correct or modify, as desired, the light admitted by the slit may be inserted in the optical system of the monochromator and preferably placed adjacent the partition 17. If transparent material is inserted in the parallel beam 20, as at the plane B, the spectrum at 26 will be modified.

Optically aligned with the lens system 24 of the monochromator and positioned so as to be focused at the plane 26 is a lens system 28 arranged to form an image of the spectrum at a distance therefrom. For reasons which will appear presently it is desirous to align a reflector or mirror 29 with the lens system 28 and arrange it in such angular relation relative to this lens system that the image forming rays will be directed to one side of the lens system 28 and re-image the spectrum at a focal plane 30. Positioned at this focal plane 30 is a partition 32 provided with an exit slit 34 extending parallel to the slit 16 and thus transversely of the elongated direction of the spectrum. It will be clear that normally the light near the center of the spectral image at the plane 30 will pass through slit 34 and since this slit is relatively narrow such will be substantially monochromatic light. For reasons which will appear later it may be desirable that the center of the spectral image normally fall slightly to one side or the other of the slit and accordingly partition 32 may be arranged for movement laterally along plane 30, or the reflector supporting base 33 may be angled slightly to give this off center condition.

A photosensitive device, such as a conventional electron multiplier 36 may be positioned closely adjacent the exit slit 34 and so as to receive the light rays passing through said slit and indicated by arrow 35 upon the photosensitive cathode of the tube. This radiant energy received by the photosensitive device produces a signal which, when amplified by means of known construction, may be impressed upon a set of vertically disposed plates of an oscilloscope tube 43 (see Fig. 3). The amount of vertical deflection of the cathode beam of the oscilloscope tube will be dependent upon the intensity of the radiant energy impinging upon the cathode of the photosensitive device. Since exit slit 34 is relatively narrow in comparison with the total length of the spectrum at plane 30 (in the neighborhood of $\frac{1}{10}$ mm. when spectrum equals 40 mm.) only a relatively small portion of the spectrum will be transmitted through slit 34 at any one time. It will be clear also that if the spectral image at the plane 30 is moved relative to the slit 34 and the radiant energy at different wave length will in turn impinge upon said cathode and electrical impulses proportional thereto will deflect the cathode ray vertically amounts equal to the intensities of the radiant energy received.

In order that the spectral image at plane 30 may be moved across exit slit 34 so that the intensities of the radiant energy at all portions thereof may be successively sensed by the photosensitive device and accordingly indicated graphically upon a fluorescent screen 46 of the oscilloscope tube, applicant has provided for the first surface mirror or reflector 29 a soft iron supporting and driving member 54 pivoted centrally thereof so that it may be oscillated rapidly about an axis 56 which is substantially parallel to slits 16 and 34 and sufficiently to successively move all portions of the spectral image across slit 34. The member 54 forms the moving armature part of a controllable electric motor 58. It has been found desirable to arrange motor 58 so as to follow substantially the well-known sinusoidal wave characteristics of a conventional source of alternating current supply which is to be employed for operating the apparatus. The alternating current supply is connected to a primary 60P of a transformer 60 and the secondary 60S of this transformer 60 is arranged to energize motor 58.

The secondary transformer terminal 61 is connected to a dry disc or equivalent rectifier 62 which is in turn connected to one terminal of an electromagnet 64. The opposite terminal of this magnet 64 is connected to one end of a variable resistance 66 which has its opposite end connected to a terminal of a second electromagnet 68. The other terminal of the electromagnet 68 is connected to a rectifier 70 and this rectifier is connected to the terminal 61. A variable arm of resistance 66 is connected to a second resistance 72 and an adjustable arm associated therewith is connected to the opposite secondary terminal 73 of transformer 60.

The motor circuit just described is such that during one half cycle of the alternating current supply a current is allowed to pass from terminal 61 through rectifier 62, electromagnet 64, resistances 66 and 72 to the other terminal 73. During the other half cycle the path of the current in the opposite direction will be from terminal 73 through resistances 72 and 66, electromagnet 68 and rectifier 70 to the opposite terminal 61. Thus, during one half cycle the electromagnet 64 will be energized so as to attract the mirror or reflector supporting and driving member 54 and during the other half cycle electromagnet 68 will be energized so as to attract the member. Thus, an oscillation will be set up in the member 54 and reflector 29 which will directly follow the alternating current frequency of the current supplied by the secondary of transformer 60.

Biasing the member 54 into a normal or neutral position are a pair of resilient members 74 which may be formed of sponge rubber or the like. Or, if desired, other suitable yieldable means such as light coil or leaf springs may be employed for urging member 54 toward said neutral position. Thus pivotal movement of the member 54 about the axis 56 will cause the spectral image to be moved through an arc totalling a few degrees, with the result that all portions of the spectral image at the plane 30 will be caused to successively traverse slit 34 and allow the radiant energy, if any, of successive wave lengths to successively impinge upon the cathode of the photosensitive device 36. The combined effect of the attractive force of each electromagnet 64 or 68 as it builds up during each cycle and the compressive force of the resilient member 74 which builds up progressively in opposition thereto is such as to produce a substantially uniform sinusoidal wave motion for reflector 29.

Also connected to the secondary terminals 61 and 73 of the transformer 60 is a D. C. or A. C. horizontal amplifier 75 which may be of conventional construction and connected to a pair of horizontal deflection plates of the oscilloscope tube 43 so as to cause the cathode beam to travel transversely across the viewing screen thereof in synchronism with the frequency and phase of the alternating current supply received from transformer 60. The cathode beam will be caused to move across the tube in one direction as the mirror 29 is moved in one direction and will be caused to move in the opposite direction as the mirror moves in a reversed direction.

Figure 2:
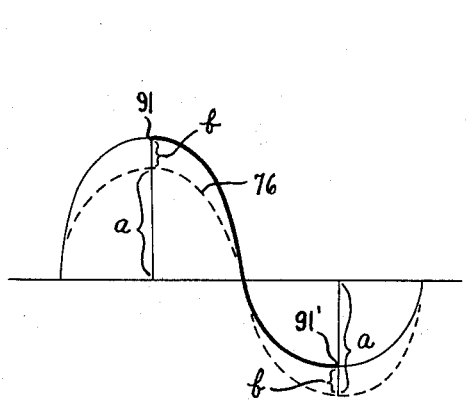
Fig. 2 is a diagrammatic representation of wave forms which may be produced by the apparatus of Fig. 1.

It is desirable to be able to control or regulate the amplitude of swing of the reflector 29 and thus the amount of travel of the spectral image across and even beyond the exit slit 34, when desired, and for this purpose the adjustable resistance 72 is provided. A decrease in the amount of resistance at 72 will increase the current through electromagnets 64 and 68 and thus the swing of the reflector 29 to opposite sides of its neutral position. The swing of the member 54, having an amplitude $a$ and plotted against time for one full cycle is shown by the dotted line curve 76 in Fig. 2. Likewise, an increase in resistance of resistor 72 will decrease the swing. It will be clear that when the swing is made to equal the length of the spectral image the image will be scanned by a substantially true sinusoidal wave motion and the successive wave lengths will be similarly plotted along the horizontal upon the screen 46, of the oscilloscope tube 43. It should be kept in mind, however, that the spectral distribution resulting from an optical refracting prism is not of a linear nature and, accordingly, the spacings between successive wave lengths are not uniform throughout all parts of the resulting spectrum. For example, in a visible spectrum produced by a refracting prism, the successive wave lengths toward the red end thereof are somewhat "pinched together" as compared to those nearer the blue end of the spectrum.

In order to employ a substantially rectilinear scale in the horizontal direction (along the abscissa) upon the viewing screen 46 and with the graph 46' positioned thereon, instead of the sine wave spacings, the reflector 29 may be allowed to travel through a greater angular amount or amplitude for one half cycle than for the other half cycle. However, since the intervals during both half cycles are equal, it will be apparent that instantaneous rates of travel of the mirror during its longer swing to one side will be greater than the corresponding rates during its shorter swing to the other side, and this non-linear condition, which can be readily varied by controllable means now to be described, can be utilized to advantage in producing a portion of each cycle of oscillation which will have characteristics such as to approximately compensate for the non-linear spectral distribution characteristics of the prism 22 so that said substantially rectilinear wave length scale may be used upon screen 46 for correct wave length readings thereon.

For this reason, the adjustable resistance 66 is provided in the connection between the electromagnets. In this way, the current through magnet 64 may be increased or decreased at the expense of the current through magnet 68 and thus the wave form of the oscillating reflector 52 during one half cycle may be increased a desired amount, for example, as indicated at $b$ and during the other half cycle decreased a substantially equal amount as indicated at $b'$ in Fig. 2. The resultant wave motion may accordingly be changed to a more desirable usable shape by moving the adjustable arm of resistor 66 one way or the other. Of course, the maximum amplitude of the reflector may be controlled or obtained by a subsequent readjustment of resistor 72. When the adjustable arm of resistance 66 is in a center position the amount of swing will be the same in both directions and no altering of the wave motion will be produced thereby. Obviously, when such a condition is desirable the resistance 66 could as readily be omitted from the circuit and resistance 72 connected directly to the adjacent terminals of the magnets 64 and 68.

Figure 3:
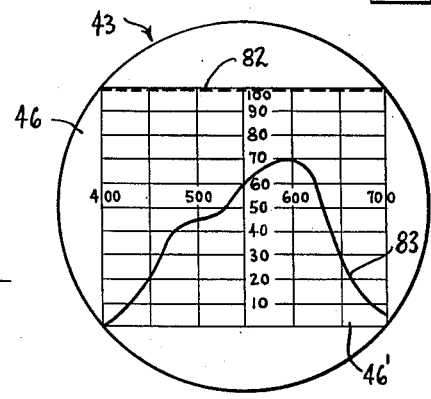
Fig. 3 is an end view of an oscilloscope showing a rectilinear graph which may be placed thereon.

Thus the intensities of the various successive wave lengths transmitted through slit 34 may be sensed by photosensitive device 36 and the amplified signal applied to the vertical deflection plates of the oscilloscope. These plates set up an electrostatic field which serves to deflect the cathode beam vertically in the tube 43 since the beam is simultaneously being moved horizontally across the screen 46 in one direction by the horizontal amplifier 75 in synchronism with the movement of reflector 29 the cathode beam will trace a path upon the screen. As described in said copending application the horizontal travel of the cathode beam in the opposite direction is normally "blanked out." In Fig. 3 is shown a graph 46' representing rectilinearly in the horizontal direction (along the abscissa) wave lengths from 400 to 700 millimicrons and in the vertical direction (along the ordinate) percentage of energy transmission. A dotted line 82 on the graph indicates the normal white light "curve" or luminous path of the beam when no specimen is in the optical path as at B. The solid line 83, on the other hand, indicates a position to which the luminous line might be suppressed immediately upon the insertion of material, for example a plate of colored glass as at B in the system. For a better understanding of the manner in which the intensity values are obtained reference is made to copending application, Serial No. 774,393, previously referred to.

Reference has previously been made to the supporting base 33 for the motor 58. When this member is arranged for angular movement, preferably about an axis coincident with the pivotal means 56, the motor and reflector 29 may be readily adjusted so as to place the center of the spectral image normally "off center" a predetermined amount relative to the slit 34. Thus, a preferred portion of the useful half cycle of the wave motion, controlled by resistances 66 and 72, may be utilized. In such case the blanking means (not shown) may be readjusted so as to properly eliminate undesired parts of the curve from screen 46.

While not shown in the drawing, it will be readily apparent from the preceding description that instead of oscillating the reflector 29 by the motor means 58 the wall 32 and exit slit 34 could as readily be oscillated by this motor means to effect a scanning of the spectral image in synchronism with the horizontal sweep of the electron stream of the oscilloscope 2. The only material changes necessitated by such a modified construction would be that the wall 32 be of relatively lightweight opaque material and the cathode of electron multiplier be of such size that it will properly receive the light passing through the movable slit for all positions thereof. In such a construction the reflector 29 may remain in the optical system or may be omitted, in which case the exit slit will be located substantially in axial alignment with the lens system 28. The use of the reflector does, however, allow a more compact construction. However, because the apparatus of Fig. 1 is of simpler construction, it is preferred.

It will be clear that the motor means 58 and associated parts for producing a readily controllable vibratory wave motion may be used in other devices wherein such a compact and efficient assembly is desirable without departing from the spirit of the present invention.

Having described my invention, I claim:

1. An electric motor assembly comprising a pair of stationary electromagnets, an oscillatable driving member, pivot means mounting said driving member for free pivotal movement relative to a fixed axis, said driving member having armature means disposed in adjacent spaced relation to each electromagnet so as to be within the electromagnetic fields thereof when said electromagnets are energized, resilient means so disposed relative to said driving member as to normally maintain said driving member in a neutral position when said electromagnets are unenergized, said resilient means being at such times unstressed but positioned closely adjacent said driving member so as to be alternately progressively stressed as said driving member is moved by either electromagnet away from said neutral position, whereby eccentric loading of said pivot means will be avoided, an electrical circuit for connecting each electromagnet to a source of alternating current, and rectifying means in each circuit arranged to allow said electromagnets to be alternately energized by said alternating current for moving said driving member away from said neutral position and for substantially sinusoidally oscillating said driving member in synchronous relation to said alternating current.

2. An electric motor assembly comprising a pair of electromagnets disposed in relatively fixed side-by-side relation, an oscillatable driving member, pivot means mounting said driving member for free pivotal movement relative to a relatively fixed axis adjacent said electromagnets, said driving member having armature means at opposite sides of said fixed axis and disposed in adjacent spaced relation to said electromagnets respectively so as to be within the electromagnetic fields thereof when said electromagnets are energized, resilient means so disposed relative to said driving member as to normally maintain said driving member in a neutral position when said electromagnets are unenergized, said resilient means being at such times unstressed but positioned closely adjacent said driving member so as to be alternately progressively compressed as said driving member is moved by either electromagnet away from said neutral position, whereby eccentric loading of said pivot means will be avoided, an electrical circuit for connecting each electromagnet to a source of alternating current, and rectifying means in each circuit arranged to allow said electromagnets to be alternately energized by said alternating current for moving said driving member away from said neutral position and for substantially sinusoidally oscillating said driving member in synchronous relation to said alternating current.

3. An electric motor assembly comprising a pair of stationary electromagnets, an oscillatable driving member, pivot means mounting said driving member for free pivotal movement relative to a fixed axis, said driving member having armature means disposed in adjacent spaced relation to each electromagnet so as to be within the electromagnetic fields thereof when said electromagnets are energized, resilient means so disposed relative to said driving member as to normally maintain said driving member in a neutral position when said electromagnets are unenergized, said resilient means being at such times unstressed but positioned closely adjacent said driving member so as to be alternately progressively stressed as said driving member is moved by either electromagnet away from said neutral position, whereby eccentric loading of said pivot means will be avoided, an electrical circuit for connecting each electromagnet to a source of alternating current, rectifying means in each circuit arranged to allow said electromagnets to be alternately energized by said alternating current for moving said driving member away from said neutral position and for substantially sinusoidally oscillating said driving member in synchronous relation to said alternating current, and adjustable means forming a part of each of said circuits and arranged when in a predetermined position to cause said driving member to effect a substantially sinusoidal wave motion, and when adjusted to a different second position of adjustment to effect an increase in the amplitude of said driving member during one-half cycle and a corresponding decrease in amplitude thereof during the other half cycle period of operation thereof.

4. An electric motor assembly comprising a pair of electromagnets disposed in relatively fixed side-by-side relation, an oscillatable driving member, pivot means mounting said driving member for free pivotal movement relative to a relatively fixed axis adjacent said electromagnets, said driving member having armature means at opposite sides of said fixed axis and disposed in adjacent spaced relation to said electromagnets respectively so as to be within the electromagnetic fields thereof when said electromagnets are energized, resilient means so disposed relative to said driving member as to normally maintain said driving member in a neutral position when said electromagnets are unenergized, said resilient means being at such times unstressed but positioned closely adjacent said driving member so as to be alternately progressively compressed as said driving member is moved by either electromagnet away from said neutral position, whereby eccentric loading of said pivot means will be avoided, an electrical circuit for connecting each electromagnet to a source of alternating current, rectifying means in each circuit arranged to allow said electromagnets to be alternately energized by said alternating current for moving said driving member away from said neutral position and for substantially sinusoidally oscillating said driving member in synchronous relation to said alternating current, and adjustable means forming a part of each of said circuits and arranged when in a predetermined position to cause said driving member to effect a substantially sinusoidal wave motion, and when adjusted to a different second position of adjustment to effect an increase in the amplitude of said driving member during one-half cycle and a corresponding decrease in amplitude thereof during the other half cycle period of operation thereof.

5. An electric motor assembly comprising a pair of stationary electromagnets, an oscillatable driving member, pivot means mounting said driving member for free pivotal movement relative to a fixed axis, said driving member having armature means disposed in adjacent spaced relation to each electromagnet so as to be within the electromagnetic fields thereof when said electromagnets are energized, resilient means so disposed relative to said driving member as to normally maintain said driving member in a neutral position when said electromagnets are energized, said resilient means being at such times unstressed but positioned closely adjacent said driving member so as to be alternately progressively stressed as said driving member is moved by either electromagnet away from said neutral position, whereby eccentric loading of said pivot means will be avoided, an electrical circuit for connecting each electromagnet to a source of alternating current, rectifying means in each circuit arranged to allow said electromagnets to be alternately energized by said alternating current for moving said driving member away from said neutral position and for substantially sinusoidally oscillating said driving member in synchronous relation to said alternating current, adjustable resistance means connected in series with both of said circuits so as to effect when adjusted an increase or a decrease in the amplitude of driving member during each half cycle period of operation thereof, and additional adjustable resistance means forming a part of each of said circuits and arranged when in a predetermined position of adjustment to cause said driving member to effect substantially equal amplitudes during both of said half cycle periods, and when adjusted to a different position of adjustment to effect an increase in the amplitude of said driving member during one half cycle and a corresponding decrease in amplitude thereof during the other half cycle period of operation thereof.

6. An electric motor assembly comprising a pair of electromagnets disposed in relatively fixed side-by-side relation, an oscillatable driving member, pivot means mounting said driving member for free pivotal movement relative to a relatively fixed axis adjacent said electromagnets, said driving member having armature means at opposite sides of said fixed axis and disposed in adjacent spaced relation to said electromagnets respectively so as to be within the electromagnetic fields thereof when said electromagnets are energized, resilient means so disposed relative to said driving member as to normally maintain said driving member in a neutral position when said electromagnets are unenergized, said resilient means being at such times unstressed but positioned closely adjacent said driving member so as to be alternately progressively compressed as said driving member is moved by either electromagnet away from said neutral position, whereby eccentric loading of said pivot means will be avoided, an electrical circuit for connecting each electromagnet to a source of alternating current, rectifying means in each circuit arranged to allow said electromagnets to be alternately energized by said alternating current for moving said driving member away from said neutral position and for substantially sinusoidally oscillating said driving member in synchronous relation to said alternating current, adjustable resistance means connected in series with both of said circuits so as to effect when adjusted an increase or a decrease in the amplitude of driving member during each half cycle period of operation thereof, and additional adjustable resistance means forming a part of each of said circuits and arranged when in a predetermined position of adjustment to cause said driving member to effect substantially equal amplitudes during both of said half cycle periods, and when adjusted to a different position of adjustment to effect an increase in the amplitude of said driving member during one half cycle and a corresponding decrease in amplitude thereof during the other half cycle period of operation thereof.

RICHARD C. BEITZ.

References Cited in the file of this patent

UNITED STATES PATENTS

| Number | Name | Date |
|---|---|---|
| 1,860,492 | Butler | May 31, 1932 |
| 1,954,029 | Stansbury | Apr. 10, 1934 |

FOREIGN PATENTS

| Number | Country | Date |
|---|---|---|
| 639,997 | Germany | Dec. 21, 1936 |